United States Patent [19]

Meurer et al.

[11] 3,809,031

[45] May 7, 1974

[54] AIR COMPRESSING SELF-IGNITING FUEL INJECTION INTERNAL COMBUSTION ENGINE

[75] Inventors: Siegfried Meurer, Augsburg; Wolfram Emmerling, Nurnberg, both of Germany; Nunzio D'Alfonso, Milano, Italy

[73] Assignee: Maschinenfabrik Augsburg-Nurnberg Aktiengesellschaft, Nurnberg, Germany

[22] Filed: Feb. 17, 1972

[21] Appl. No.: 227,129

[30] Foreign Application Priority Data
  Feb. 19, 1971  Germany.......................... 2108012

[52] U.S. Cl. .......................... 123/32 R, 123/30 D
[51] Int. Cl. ............................................ F02b 19/00
[58] Field of Search............ 123/32 R, 32 C, 32 SP, 123/30 R, 30 D

[56]  References Cited
  UNITED STATES PATENTS

| | | | |
|---|---|---|---|
| 2,995,121 | 8/1961 | Muerer | 123/32 R |
| 2,942,591 | 6/1960 | Meurer | 123/32 R |
| 2,947,292 | 8/1960 | Bottger | 123/32 R |
| 2,975,773 | 3/1961 | Meurer | 123/32 R |
| 3,046,959 | 7/1962 | Meurer | 123/32 R |

*Primary Examiner*—Laurence M. Goodridge
*Attorney, Agent, or Firm*—Walter Becker

[57]  ABSTRACT

An air compressing self-igniting fuel injection internal combustion engine, which includes a piston having a combustion chamber therein which receives the main portion of the injected fuel in the form of a thin film applied to the wall of the combustion chamber, and in which the geometric fuel jet direction during the injection step is so selected that the fuel film formed on the wall of the combustion chamber extends over as great a portion of the depth of the combustion chamber as possible, the fuel film in view of its kinetic energy and the air circulation in the combustion chamber being conveyed to a downward step where at least a part of the fuel film breaks up and in droplet form and/or vapor form intermixes with the circulating combustion air.

4 Claims, 2 Drawing Figures

PATENTED MAY 7 1974     3,809,031

AIR COMPRESSING SELF-IGNITING FUEL INJECTION INTERNAL COMBUSTION ENGINE

The present invention relates to an air compressing self-igniting fuel injection internal combustion engine with a combustion chamber which is arranged in the piston and which at the end of the compression stroke receives nearly the entire combustion air which by suitable means is subjected to rotation about the cylinder axis, in which engine the main portion of the injected liquid fuel is in one or a plurality of fuel jets substantially tangentially and in the direction of the circulating air applied to the wall of the combustion chamber in the form of a thin film which film evaporates and intermixes with the circulating combustion air and is finally burned.

When practicing this injection and mixture forming method, various types of combustion chambers may be employed. In this connection it is merely important that the fundamental principle of the method is maintained which means that the fuel is applied in the form of a thin film onto the wall of the combustion chamber and that the combustion air is subjected to a proper twist. For reasons of a simple construction and also for taking the best advantage of the flow technical factors of the combustion air, it was heretofore customary to design the combustion chambers as bodies of revolution, for instance, ball-shaped combustion chambers, ellipsoidal combustion chambers, or the like.

Engines operating in conformity with the method according to which the fuel is applied to the wall of the combustion chamber have a number of advantages of which there are to be mentioned in particular low exhaust gas clouding, favorable fuel consumption, high specific output, and quiet operation.

Engines working according to this principle have, however, also the drawback that after the start or during certain conditions of operation in which the wall of the combustion chamber has not reached the temperature necessary for the evaporation of the fuel film (for instance during idling or in the lower load range), white and/or blue smoke occurs which impedes the view of the drivers of following vehicles and under certain circumstances may even constitute a health hazard. In such instances the combustion is sluggish and incomplete so that, with regard to the conditions of operation in which the engine or the wall of the combustion chamber has reached its optimum combustion temperature, the exhaust gas quality is considerably lower and in particular with regard to unburned hydrocarbons and carbonmonoxide. Furthermore, with the compression conditions designed for satisfactory output and low maximum combustion pressure, the starting ability in cold weather of such engines is limited so that frequently additional cold starting devices will become necessary; if the engine under such conditions is operated for a longer period of time at too low a temperature of the wall of the combustion chamber, the incomplete combustion may cause the formation of residues in the cylinder and in the exhasut system which residues may cause damage to the engine.

Numerous suggestions have been made to overcome these drawbacks. Thus, for instance, it is known in addition to increasing the compression ratio, during idling and in the lower load range to turn off some of the cylinders and to operate the engine only with the remaining cylinders. In this connection it is also known to turn the injection nozzle in conformity with the temperature of the wall of the combustion chamber in such a way that the application of the fuel to the wall of the combustion chamber is reduced or completely shut off when the engine is cold. It is furthermore known to destroy the air twist when the engine is cold or to change the direction of the air circulation so that it is opposite to the direction of the fuel injection. All these devices and methods and the control means required in connection therewith are complicated, expensive to manufacture and are sometimes also liable to disorders. Moreover, the result consists only in an improvement of the starting conditions in cold weather and in an improvement of the combustion in the lower load range while in most instances this occurs at the expense of the output in the upper load range, and other disadvantages have to be put up with which result in a sacrifice of the advantages inherent to the application of the fuel to the wall of the combustion chamber.

It is, therefore, an object of the present invention for an internal combustion engine of the above described type by simple means to prevent the formation of white and/or blue smoke during idling and in the lower load range or at least considerably to reduce this drawback and to improve the starting ability in cold weather and also to improve the exhaust gases with re-gard to their hydrocarbon and carbonmonoxide content over the entire range of operation or in the entire field of the performance graph without having to sacrifice the above outlined advantages.

This object and other objects and advantages of the invention will appear more clearly from the following specification in connection with the accompanying drawing, in which.

Figure 1:
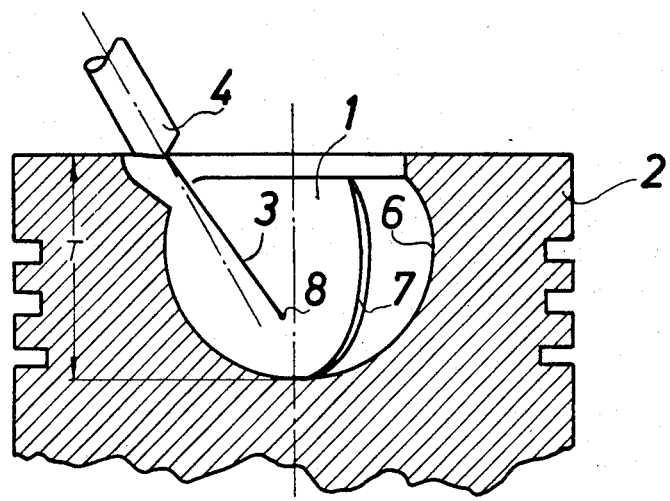
FIG. 1 illustrates a longitudinal section through a portion of a piston with a combustion chamber according to the invention, said section being taken along the line I — I of FIG. 2.
Figure 2:
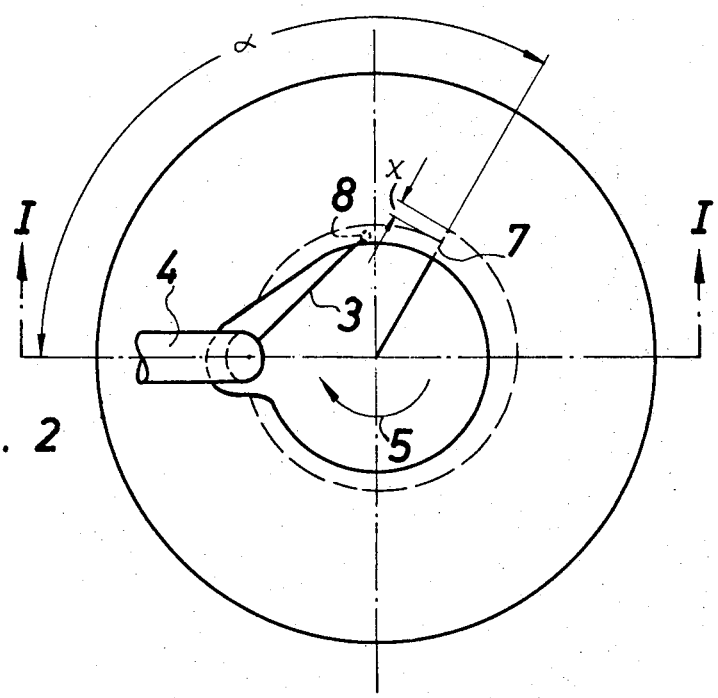
FIG. 2 is a top view of the piston of FIG. 1.

The present invention is characterized primarily in that the geometric fuel jet direction or directions during the injection step is or are selected so that the fuel film forming on the wall of the combustion chamber extends over as large an area as possible of the depth of the combustion chamber and that this fuel film due to its kinetic energy and due to the air circulation in the combustion chamber is, when viewing in the direction of the air flow, conveyed to a step which is located behind or downstream of the point where the fuel impacts upon the wall of the combustion chamber and which extends primarily transverse to and faces the direction of flow of the combustion air. At this step at least a part of the fuel film will break up and in the form of droplets and/or in vapor form will intermix with the circulating combustion air.

According to a further development of the invention and in order to obtain as favorable conditions as possible, it is suggested that the step, when viewed in the direction of the air twist, is arranged behind the injection nozzle at a distance of $\alpha = 90°$ to $140°$, and it is furthermore suggested that the axis of the associated injection jet or the axes of the injection jets penetrates or penetrate at least 65 percent of the depth of the combustion chamber and that the impact point or impact points of the fuel jet or fuel jets upon the wall of the combustion chamber is or are located less than 90° behind the injection nozzle when viewing in the direction of the air twist.

The depth of the step in radial direction should, in conformity with the present invention, be between 4 and 10 percent of the largest diameter of the combustion chamber. As to its length, the step extends at a maximum over the entire depth of the combustion chamber, while it is located at an angle with regard to the cylinder axis which is less than 30°.

It is known that the air compressed by the compression stroke in the combustion chamber has considerably higher temperatures than the wall of the combustion chamber. In view of the arrangement according to the present invention, the fuel is injected upon the combustion chamber wall in a certain range and in view of the injection pressure and the air twist acting in the same direction will spread in the direction of the air twist. As soon as the fuel reaches the step, it will break up and intermix directly with the combustion air. The formation of the mixture is further aided by the air turbulence occurring at this step. In this way the cold starting ability and the quality of the exhaust gases with regard to hydrocarbons and carbonmonoxide is considerably improved and the formation of white and/or blue smoke during idling and in the lower load range will be avoided. During partial load and full load, when the wall of the combustion chamber will have its optimum temperature, the conditions in the combustion chamber will in view of the temperature, the injection pressure and the air twist change to such a degree that also here an improvement in the exhaust quality will be obtained without encountering other drawbacks.

The German Offenlegungsschrift No. 1,526,316 discloses a piston for an air compressing internal combustion engine which piston has its combustion chamber provided with a plurality of stair-like steps or edges. These steps or edges are intended to improve the suitability of the engine for various types of fuel and also to improve the starting in cold weather and are in particular intended to permit a pre-oxidation of fuels having a high boiling point, inasmuch as the fuel skips over the steps and then again reaches the wall of the combustion chamber. Such a design, however, is not advantageous for solving the problem underlying the present invention because the advantages of a stepless combustion chamber are not retained with the result that primarily in the upper speed range and in the upper load range the characteristic engine data are disadvantageously affected. Moreover, with the above mentioned known internal combustion engine, in contrast to the present invention, the fuel injection is effected within the range of one or even more steps.

Furthermore British Patent No. 807,712 describes a fuel injection combustion engine with a combustion chamber in the piston, in which the wall of the combustion chamber has sharp-edged undercuts. With this engine, the injection nozzle is arranged centrally with regard to the combustion chamber, and the fuel jets are injected radially directly into the circulating air. Thus, a completely different injection and mixture forming process is involved. The undercuts merely have the purpose of producing a kind of breaking-up air turbulence for aiding the atomization of the fuel.

Referring now to the drawing in detail, the combustion chamber 1 which in the specific example shown in the drawing is ball-shaped is coaxially arranged in the piston 2 pertaining to a non-illustrated internal combustion engine. The fuel is in the form of one or more jets 3 injected onto the wall 6 of the combustion chamber 1 through an injection nozzle 4 and, more specifically, is injected substantially tangentially to the wall 6 and substantially in the direction of the air circulating in combustion chamber 1 as indicated by the arrow 5. In view of the direction of the jet and due to its kinetic energy as well as due to the influence of the highly compressed air circulating in the combustion chamber 1, the fuel spreads on wall 6 as a thin film which after a short stay on the wall 6 breaks up at a step 7 which is at an angle $\alpha$ arranged behind or downstream of the injection nozzle 4 when considering the direction of flow of the air. In addition thereto, at least a portion of the liquid fuel contained in the film in the form of droplets or vapor comes into direct contact with the combustion air and by the turbulence forming behind the step 7 is refined or atomized at an accelerated rate, is intermixed with air and finally burned. In order to be able as far as possible to take advantage of the length of step 7 for the described effect, which length in the particular example shown extends transverse to the direction of the flow 5 of the air, the jet or jets 3 is or are so directed that the jet or jets penetrate at least 65 percent of the depth T of the combustion chamber and that the geometric impact point 8 on the wall 6 of the combustion chamber, when viewed in the direction of flow of the air 5, is located shortly ahead of the end of the first quadrant, whereas the step 7 is arranged in the first half of the second quadrant. The step 7 is here sharp edged. The depth X of step 7 amounts to from 4 to 10 percent of the greatest diameter of the combustion chamber.

It is, of course, to be understood that the present invention is, by no means, limited to the particular showing in the drawing but also comprises any modifications within the scope of the appended claims.

What is claimed is:

1. An air compressing self-igniting fuel injection internal combustion engine which includes in combination: a piston having a combustion chamber therein, which has an opening with a peripheral edge and a substantially peripheral wall, means for conveying combustion air into and subjecting it to a circulatory movement in said combustion chamber, and an injection nozzle adjacent to the edge of said combustion chamber for injecting liquid fuel tangentially of the annular periphery into said combustion chamber and with kinetic energy in direction of air circulatory movement therein so as to form a fuel film as extensively as possible by spraying and as a consequence of kinetic energy thereof on the combustion chamber wall, said combustion chamber wall being provided with an abrupt step downstream of said nozzle seen in direction of air circulatory movement and extending substantially axially of said piston along said wall and located transversely to and facing downstream the air movement and fuel flow along said wall, the geometric fuel jet direction during the fuel injection being such that the fuel film forming on the combustion chamber wall extends over as large a portion of the depth of the combustion chamber as possible and is conveyed by air circulatory movement and kinetic energy to said step and that at least a part of said fuel film breaks up at said step by forceful separation from unvaporized liquid fuel and intermixes with the rotating combustion air to spread out therewith, said step when being viewed in the direction of flow of the combustion air being located downstream of the impact point of the fuel onto the combustion chamber wall thereto . . . in which said step when being viewed in the direction of the air twist is arranged behind the injection nozzle by an angle of from 90° to 140°, and in which the jet axis of the fuel jet penetrates at least 65 percent of the depth of said combustion chamber while the impact point of the fuel jet onto the combustion chamber wall is when viewed in the direction of the air twist located behind the injection nozzle by an angle of less than 90°.

2. An internal combustion engine in combination according to claim 1, in which the depth of said step when viewed in radial direction equals from 4 to 10 percent of the maximum diameter of said combustion chamber.

3. An internal combustion engine in combination according to claim 2, in which said step in the combustion chamber wall extends over substantially the entire depth of said combustion chamber.

4. An internal combustion engine in combination according to claim 3, in which the step in the combustion chamber wall is located at an angle of less than 30° with regard to the longitudinal axis of said piston.

* * * * *